United States Patent

Hsu et al.

[11] Patent Number: 6,059,389
[45] Date of Patent: May 9, 2000

[54] DEVICE HOUSING FOR CD-ROM PLAYER AND THE LIKE

[76] Inventors: Chen-Tung Hsu; Wei-Pan Fu, both of 7F, No. 6, Wen Shan Street, Chu Bei City, Hsin Chu Hsien, Taiwan

[21] Appl. No.: 09/322,922

[22] Filed: Jun. 1, 1999

[51] Int. Cl.⁷ ................................................ H05K 7/18
[52] U.S. Cl. ................................ 312/330.1; 312/223.2
[58] Field of Search .................................. 369/75.1, 75.2, 369/77.1, 77.2, 247, 248; 361/685, 727, 725; 312/223.1, 223.2, 331, 330.1, 350; 360/97.01, 97.02

[56] References Cited

U.S. PATENT DOCUMENTS

| | | | |
|---|---|---|---|
| 4,896,312 | 1/1990 | Odawara | 369/77.2 |
| 5,231,623 | 7/1993 | Kanno et al. | 369/75.1 X |
| 5,768,238 | 6/1998 | Tanaka | 369/75.2 |
| 5,844,874 | 12/1998 | Saito et al. | 369/77.1 |

Primary Examiner—Janet M. Wilkens
Attorney, Agent, or Firm—Dougherty & Troxell

[57] ABSTRACT

A device housing for example a CD-ROM player, which includes a rack having two recessed seats bilaterally disposed at one side and two cushions at the recessed seats; a slide, the slide having a sliding rack meshed with a reducing gear, two longitudinal tracks at two opposite lateral sides, and two calibration members for guiding linear motion of the slide, the calibration members each having a bottom coupling flange respectively coupled to the tracks, two mounting lugs at one side, and a horizontal bottom bearing flange, the horizontal bottom bearing flange defining a receiving space for receiving said tracks; a casing, the casing having two mounting holes bilaterally disposed near a rear side thereof, and two pairs of side holes disposed at two opposite vertical side walls thereof and respectively fastened to the mounting lugs at the calibration members; and a suspension plate connected between the rack and the casing, the suspension plate having two first mounting holes disposed at two opposite ends thereof and respectively fastened to the mounting holes at the casing, two angled legs respectively raised from the two opposite ends thereof at one side, and two second mounting holes respectively provided at the angled legs and respectively fastened to the cushions in the recessed seats of the rack.

2 Claims, 4 Drawing Sheets

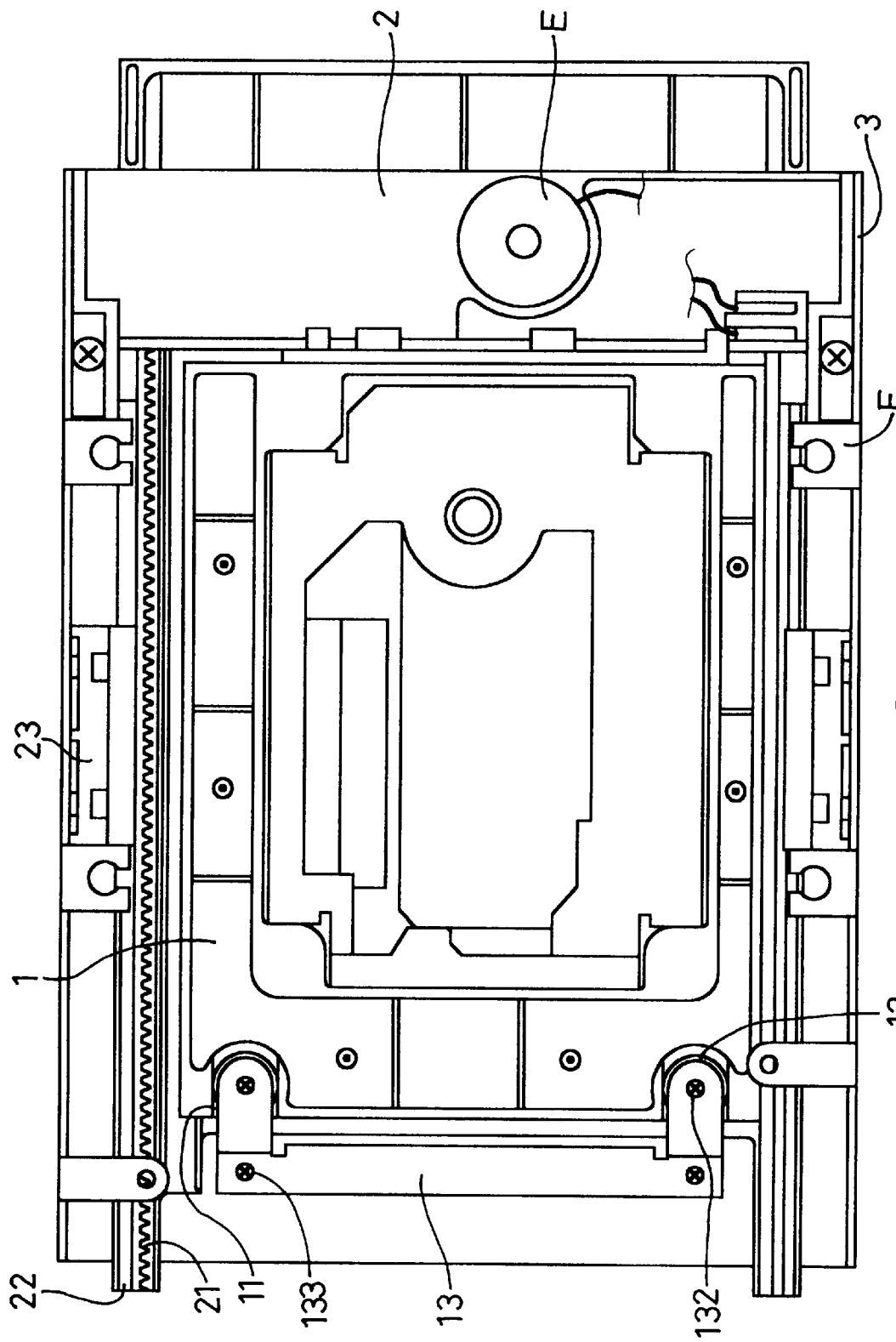

DEVICE HOUSING FOR CD-ROM PLAYER AND THE LIKE

BACKGROUND OF THE INVENTION

The present invention relates to a device housing for VCD player, DVD player, CD-ROM player, etc., and more particularly to such a device housing which has shock-preventive means.

An optical disk player, for example, a VCD player, DVD player, or CD-ROM player is generally comprised of a read head, and a speed reduction motor. In order to achieve a stable operation, shock absorbing means is installed to absorb shocks. The housing of an optical disk player, as shown in FIG. 1, comprises a carriage A, which holds the speed reduction motor and the read head. The carriage A can be moved in a rack B. When a disk is loaded, the carriage A is moved along a track in the rack B, enabling the read head to read in data. The rack B is covered with a frame C and a metal shell D. The metal shell D and the frame C are fixedly fastened together. The frame C is fixedly connected to the rack B. Because the carriage A and the shell D are metal members and the rack B and the frame C are respectively molded from plastics, the assembly process of the optical disk player is complicated, and the related manufacturing cost is high. Furthermore, during the operation of the optical disk player, vibrating waves tend to be transmitted to the read head, causing the data reading operation of the read head unstable to be affected.

SUMMARY OF THE INVENTION

The present invention has been accomplished to provide a device housing which eliminates the aforesaid drawbacks. It is one object of the present invention to provide a device housing for an optical disk player which is inexpensive to manufacture. It is another object of the present invention to provide a device housing for an optical disk player which prevents transmission of shocks to the read head installed therein. To achieve these and other objects of the present invention, there is provided a device housing, which comprises a rack having two recessed seats bilaterally disposed at one side and two cushions at the recessed seats; a slide, the slide having a sliding rack meshed with a reducing gear, two longitudinal tracks at two opposite lateral sides, and two calibration members for guiding linear motion of the slide, the calibration members each having a bottom coupling flange respectively coupled to the tracks, two mounting lugs at one side, and a horizontal bottom bearing flange, the horizontal bottom bearing flange defining a receiving space for receiving said tracks; a casing, the casing having two mounting holes bilaterally disposed near a rear side thereof, and two pairs of side holes disposed at two opposite vertical side walls thereof and respectively fastened to the mounting lugs at the calibration members; and a suspension plate connected between the rack and the casing, the suspension plate having two first mounting holes disposed at two opposite ends thereof and respectively fastened to the mounting holes at the casing, two angled legs respectively raised from the two opposite ends thereof at one side, and two second mounting holes respectively provided at the angled legs and respectively fastened to the cushions in the recessed seats of the rack.

BRIEF DESCRIPTION OF THE DRAWINGS

The foregoing and other features and advantages of the present invention will be more clearly understood from the following detailed description and the accompanying drawings, in which.

FIG. 4 is a top view of the device housing according to the present invention.

DETAILED DESCRIPTION OF THE PREFERRED EMBODIMENTS

Figure 1:
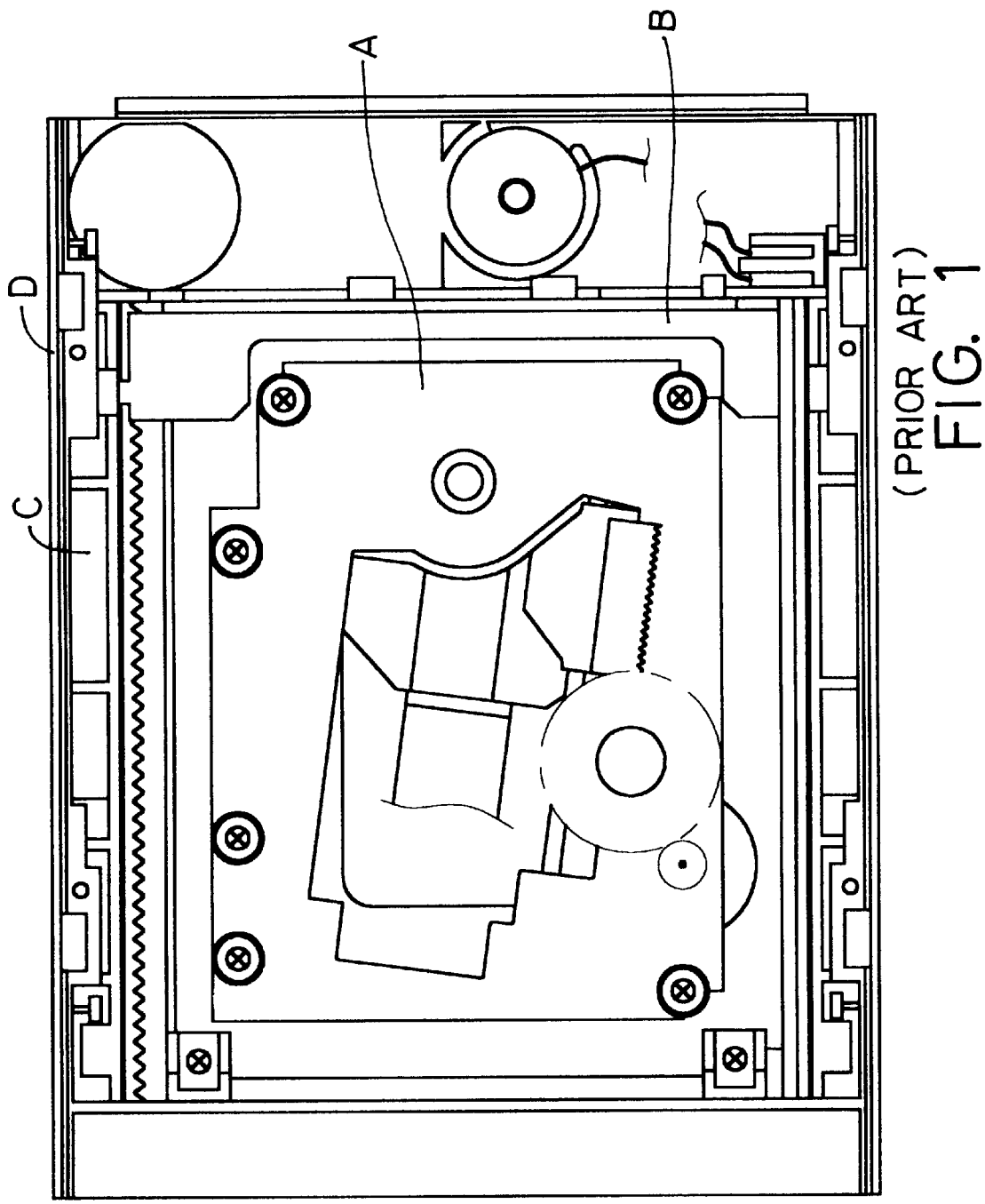
FIG. 1 is a top view of a CD-ROM player according to the prior art.
Figure 2:
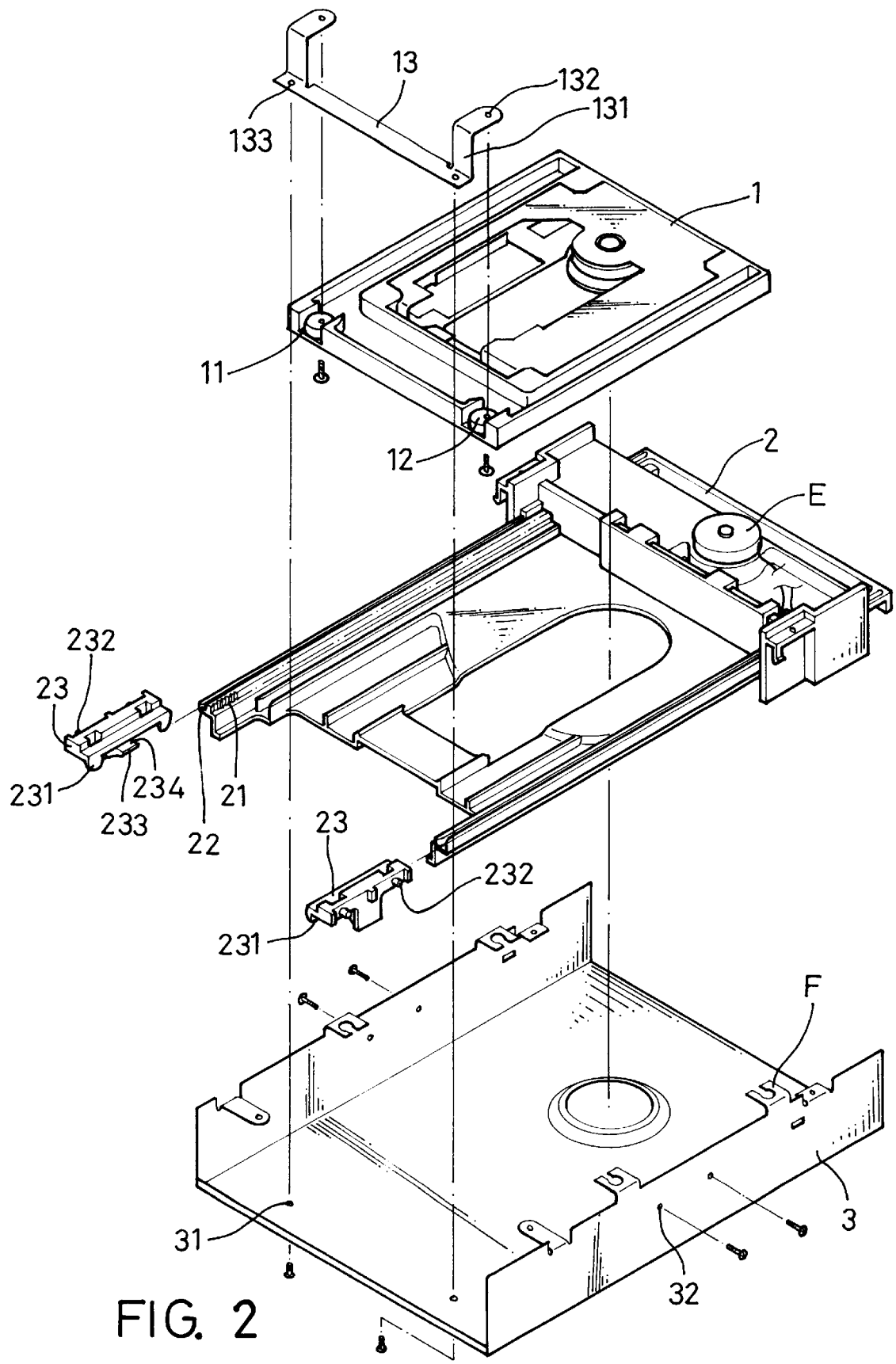
FIG. 2 is an exploded view of a device housing according to the present invention.
Figure 3:
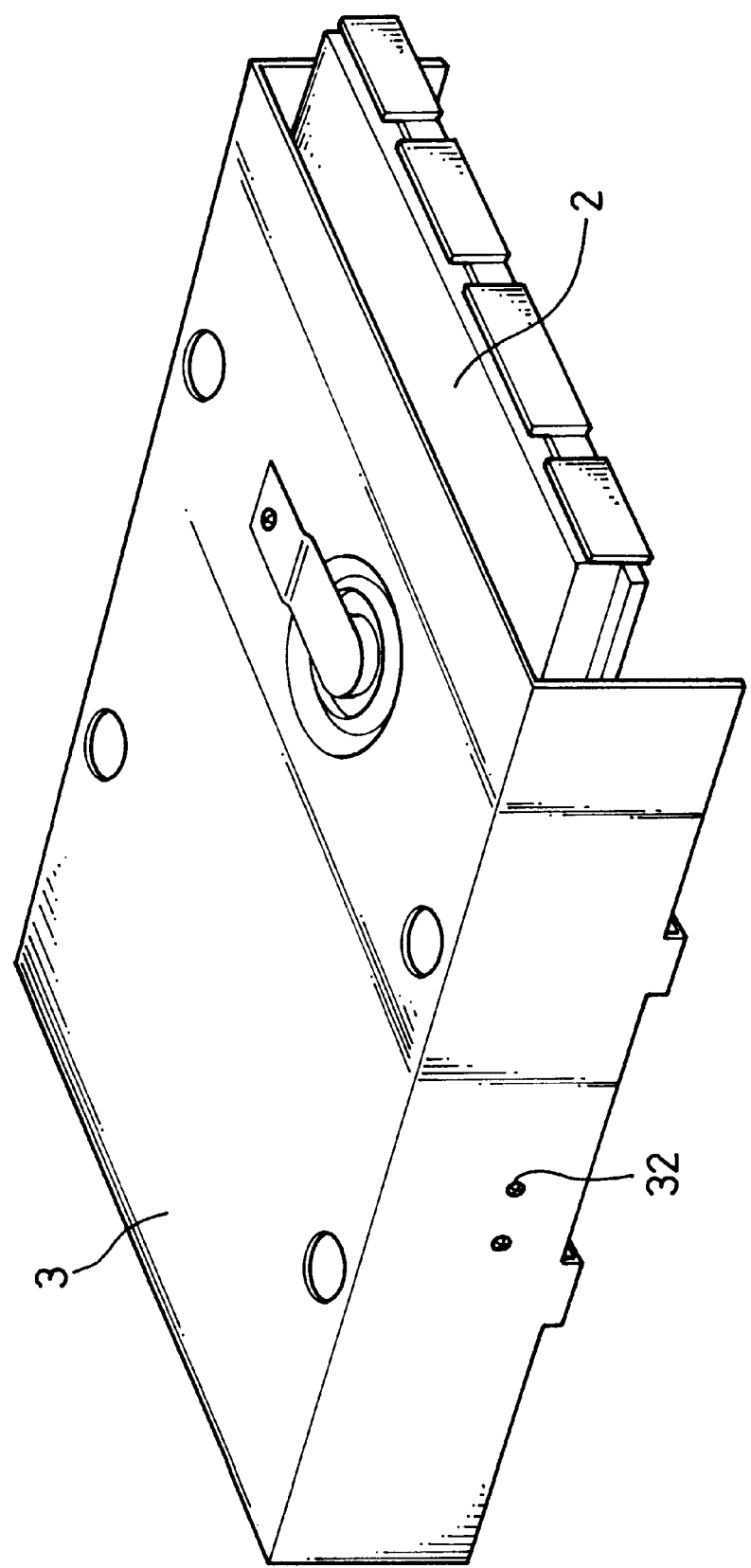
FIG. 3 is an assembly view of the device housing according to the present invention.

Referring to FIGS. from 2 through 4 a device housing in accordance with the present invention is generally comprised of a rack 1, a slide 2, a pressure plate 13, two calibration members 23, and a casing 3.

The rack 1 is provided to hold a read head and a motor, having two recessed seats 11 bilaterally disposed at its one side, and two cushions 12 respectively fixedly mounted on the recessed seats 11. The pressure plate 13 comprises two first mounting holes 133 at its two opposite ends, two angled legs 131 respectively raised from its two opposite ends at one side, and two second mounting holes 132 at the angled legs 131 remote from the first mounting holes 133. The angled legs 131 are respectively attached to the cushions 12 in the recessed seats 11, and then the second mounting holes 132 are respectively and fixedly fastened to the cushions 12 and the recessed seats 11 by respective fastening elements, for example, screws.

The slide 2 is a flat member, comprising a motor E at its front side, a reducing gear (not shown) coupled to the motor E, a sliding rack 21 longitudinally disposed at its one lateral side and meshed with the reducing gear, and two longitudinal tracks 22 at its two opposite lateral sides. The calibration members 23 are fastened to the casing 3 to guide linear motion of the slide 2, each comprising a bottom coupling flange 231, two mounting lugs 232 at one side respectively fixedly fastened to the casing 3, and a horizontal bottom bearing flange 233 defining a receiving space 234. The receiving space 234 of each calibration member 23 fits the thickness of the tracks 22, so that the tracks 22 can be respectively inserted into the receiving space 234 at each calibration member 23.

The casing 3 is made by stamping a metal sheet into shape, having a substantially U-shaped profile, a plurality of notched mounting flanges F for the connection of external device means, two mounting holes 31 bilaterally disposed near its rear side and respectively fastened to the first mounting holes 133 at the pressure plate 13 by, for example, screws, and two pairs of side holes 32 disposed at two opposite vertical side walls thereof and respectively fastened to the mounting lugs 232 at the calibration members 23 by, for example, screws. The size of the casing 3 fits the slide 2, so that the slide 2 can be moved in and out of the casing 3.

During assembly process, the cushions 12 are fastened with the recessed seats 11 of the rack 1 to the second mounting holes 132 at the angled legs 131 of the pressure plate 13, then the mounting lugs 232 of the calibration members 23 are respectively fastened to the side holes 32 at the casing 3, and then the tracks 22 of the slide 2 are respectively coupled to the bottom coupling flange 231 at each calibration member 23 and inserted into the receiving space 234 at each calibration member 23, and then the first mounting holes 133 of the pressure plate 13 are respectively fastened to the mounting holes 31 at the casing 3.

As indicated above, the present invention achieves numerous advantages as outlined hereinafter:

1) Because the rack 1 is directly connected to the casing 3 by the pressure plate 13, vibration can be directly absorbed by the casing 3 without passing through the slide 2.
2) Because the rack 1 is suspended from the casing 3, and cushions 12 are provided between the rack 1 and the casing 3 to absorb shocks, the slide 2 can be stably reciprocated relative to the rack 1, and a highly stable reading operation can be achieved.
3) Because less parts are used, less material and molding tool cost is needed.

While only one embodiment of the present invention has been shown and described, it will be understood that various modifications and changes could be made thereunto without departing from the spirit and scope of the invention disclosed.

What is claimed is:

1. A device housing comprising:

a rack for holding a read head and a speed reduction motor, said rack comprising two recessed seats bilaterally disposed at one side thereof, and two cushions respectively fixedly mounted on said recessed seats;

a slide, said slide comprising a sliding rack longitudinally disposed at one of two lateral sides thereof, two longitudinal tracks at the two opposite lateral sides thereof, and two calibration members for guiding linear motion of said slide, said calibration members each comprising a bottom coupling flange respectively coupled to said tracks, two mounting lugs at one side, and a horizontal bottom bearing flange, said horizontal bottom bearing flange defining a receiving space for receiving said tracks;

a casing receiving said rack and said slide, said casing comprising two mounting holes bilaterally disposed near a rear side thereof, and two pairs of side holes disposed at two opposite vertical side walls thereof and respectively fastened to the mounting lugs at said calibration members; and a suspension plate connected between said rack and said casing, said suspension plate comprising two first mounting holes disposed at two opposite ends thereof and respectively fastened to the mounting holes at said casing, two angled legs respectively raised from the two opposite ends thereof at one side, and two second mounting holes respectively provided at said angled legs and respectively fastened to said cushions in said recessed seats of said rack.

2. The device housing of claim 1 wherein said casing comprises notched mounting flanges for the connection of external device means.

* * * * *